United States Patent
Edwards

(10) Patent No.: US 7,162,082 B2
(45) Date of Patent: Jan. 9, 2007

(54) METHOD AND APPARATUS FOR PERFORMING A CLEAN BACKGROUND SUBTRACTION

(75) Inventor: Jeffrey L. Edwards, San Jose, CA (US)

(73) Assignee: Electric Planet, Inc., Palo Alto, CA (US)

(*) Notice: Subject to any disclaimer, the term of this patent is extended or adjusted under 35 U.S.C. 154(b) by 0 days.

(21) Appl. No.: 10/126,479

(22) Filed: Apr. 18, 2002

(65) Prior Publication Data

US 2002/0172433 A1 Nov. 21, 2002

Related U.S. Application Data

(63) Continuation of application No. 09/174,491, filed on Oct. 15, 1998, now Pat. No. 6,411,744.

(51) Int. Cl.
G06K 9/34 (2006.01)
G06K 9/46 (2006.01)
G06K 9/20 (2006.01)
G06K 9/32 (2006.01)

(52) U.S. Cl. .............. 382/173; 382/201; 382/282; 382/293

(58) Field of Classification Search .......... 382/209, 382/190, 217, 195, 197, 199, 282, 294, 256, 382/257, 173, 201, 293; 345/474, 473, 629; 700/83
See application file for complete search history.

(56) References Cited

U.S. PATENT DOCUMENTS

| | | | | |
|---|---|---|---|---|
| 4,843,568 A * | 6/1989 | Krueger et al. | ............. | 382/100 |
| 5,142,589 A * | 8/1992 | Lougheed et al. | ........... | 382/102 |
| 5,563,988 A * | 10/1996 | Maes et al. | .............. | 345/421 |
| 5,781,198 A * | 7/1998 | Korn | ........................ | 345/634 |
| 5,790,124 A * | 8/1998 | Fischer et al. | .............. | 345/629 |
| 5,930,391 A * | 7/1999 | Kinjo | ....................... | 382/173 |
| 5,940,538 A * | 8/1999 | Spiegel et al. | ............. | 382/236 |
| 5,990,908 A * | 11/1999 | Thingvold | .................. | 345/474 |
| 5,995,639 A * | 11/1999 | Kado et al. | ................. | 382/118 |
| 6,141,463 A * | 10/2000 | Covell et al. | ............... | 382/286 |
| 6,400,374 B1 * | 6/2002 | Lanier | ........................ | 345/630 |
| 6,445,814 B1 * | 9/2002 | Iijima et al. | ................ | 382/154 |
| 6,636,635 B1 * | 10/2003 | Matsugu | ..................... | 382/218 |
| 6,650,778 B1 * | 11/2003 | Matsugu et al. | ........... | 382/209 |
| 2002/0154820 A1 * | 10/2002 | Kaneko et al. | ............ | 382/209 |

OTHER PUBLICATIONS

Covell et al., "Eigen-points [image matching]", International conference on Image processing, Sep. 19, 2996.*

(Continued)

Primary Examiner—Vikkram Bali
Assistant Examiner—Colin LaRose
(74) Attorney, Agent, or Firm—Van Pelt, Yi & James LLP

(57) ABSTRACT

A background subtraction apparatus of the present invention includes a key point locator for locating key points on a known object type, a boundary point locator for locating boundary points of the known object that make up the edges of the known object, and an edge processor for processing the edges to provide a clean-edged extraction of the known object from a background image. Preferably, the key point locator includes an alignment detector for detecting alignment of an image of the known object type with a skeleton image. Still more preferably, the skeleton image is an exoskeleton image and the known object type is a human being.

28 Claims, 6 Drawing Sheets

OTHER PUBLICATIONS

Baumberg et al., "An efficient method for contour tracking using active shape models", IEEE workshop on Motion of Non-rigid and Articulated Objects, Nov. 12, 1994.*

Sullivan et al., "using active-deformable models to track deformable objects in robotic visual servoing experiments", IEEE International conference on Robotics and Automation, Apr. 28, 1996.*

Tsai, Robust affine invariant matching with application to line features, IEEE Computer Society Conference on Computer Visio and Pattern Recognition, Jun. 17, 1993.*

Wren et al., "Pfinder: real-time tracking of the human body", Proceedings 2nd International Conference on Automatic face and Gesture recognition, Oct. 16, 1996.*

"Comparing Images Using The Hausdorff Distance", Huttenlocher, D.P.; Klanderman, G.A.; Rucklidge, W.J., Sep. 1993, IEEE Transactions on Pattern Analysis and Machine Intelligence, vol. 15, Issue: 9, pp. 850-863.*

"Locating Objects Using The Hausdorff Distance", Rucklidge, W.J., Jun. 20-23, 1995, Fifth International Conference on Computer Vision, 1995, Proceedings, pp. 457-464.*

W. Lee, P. Kalra, N.M. Thalmann, "Model based Face Reconstruction for Animation", MIRALab© 1998.*

A. Kass, M. Witkin and D. Terzolpoulos, "Snakes: Active Contour Models", International Journal of Computer Vision, vol. 1, 1987.*

A. Blake and M. Isard. Active Contours. Springer-Verlag© 1998. pp. 25-37, 170.*

* cited by examiner

METHOD AND APPARATUS FOR PERFORMING A CLEAN BACKGROUND SUBTRACTION

CROSS REFERENCE TO RELATED APPLICATIONS

This is a continuation of application Ser. No. 09/174,491, now U.S. Pat. No. 6,411,744, filed Oct. 15, 1998.

BACKGROUND OF THE INVENTION

The present invention relates generally to computer vision systems and digital image processing, and more particularly to the digital extraction of an image from its background.

To produce certain special visual effects, it is often desirable to separate a foreground image from a background image. One method for accomplishing this task is referred to as "blue-screening" and involves placing a blue or other fixed-color screen (e.g. a green screen) behind the desired foreground object, typically the image of a person (the colors blue and green hue that strongly contrasts with most colors of human skin). In blue-screening, the system checks to see which pixels in the input image are not blue and labels those pixels as foreground pixels. The system can then composite, or blend, the object (i.e. the collection of all foreground pixels) onto a destination background image.

One of the disadvantages of using blue-screening for object compositing is that it requires a fixed color screen behind the object. Another disadvantage is that if any of the colors on the object, such as an item of clothing, are blue, "holes" will appear in the object in the destination image. This occurs because the pixels in the blue areas on the object will not be labeled as foreground pixels and thus will not be composited with the rest of the object, resulting in the object having holes when composited onto the destination image. Another disadvantage is, obviously, the need for a special room or screen to provide the appropriate background color.

Other prior art background subtraction procedures, from the field of computer vision, are used to eliminate the fixed color screen requirement. One procedure involves building an average background image by taking a predetermined number of sample images of a typically multi-colored background and creating a background model. For each new sample image taken, each pixel in the new image is compared to its corresponding pixel in the background model being formed. Changes are assumed to be to the foreground object, i.e. this is done to determine whether the pixel in the current sample image is a foreground ("object"). Pixels that are determined to be part of the foreground are then blended or composited onto the destination image.

One disadvantage with this procedure is if a foreground pixel happens to match its corresponding background model pixel color, it will not be considered a foreground pixel. This will introduce holes into the composited object. Another disadvantage is that shadows cast by the object often make the object, when composited, appear to have its original form plus extraneous appendages (as a result of the shadows). This is because the procedure may mistakenly label the "shadow" pixels as foreground pixels.

Yet another disadvantage is that if any portion of the background changes or if the camera is moved while the background model is being built, certain portions of the background (e.g. the portions that moved) will be incorrectly labeled as part of the foreground and be composited onto the destination image. Although there are prior art techniques for updating the background model to reflect changes, they cannot account for a constantly changing background such as one that includes a changing television screen or a window looking out onto a busy street.

As is apparent from the foregoing discussion, it has been difficult to obtain a clean-edged outline for a foreground image being extracted from a background image. One known method of creating a clean-edged outline is hand painting the outline for the background subtraction which is typically done by an application developer. While this is appropriate in the application design stage, it is not appropriate for an end user to have to hand paint or manually create the outline of the image.

SUMMARY OF THE INVENTION

The present invention creates a clean-edged extraction of a foreground image from its background in an automated and effective manner. More particularly, the present invention includes an improved method of background subtraction wherein a clean image of the object being composited or texture mapped is created through improvements in determining the outline of the object. As a result, the present invention reduces noise near the edges of an object in an input image from which the background is being "subtracted." The resulting image can be used for example, in a texture map application or for compositing.

In the texture mapping process any errors that may occur in the background subtraction or inaccuracies that arise from the background subtraction will typically remain throughout the duration of the process. The present invention provides a closed curve which is essentially a noise-reduced outline of the object that is being mapped or composited. By virtue of this process there are no holes or gaps within the object image when it is mapped or composited, since all pixels within the closed curve are reconsidered part of the object.

A background subtraction apparatus of the present invention includes a key point locator for locating key points on a known object type, a boundary point locator for locating boundary points of the known object that make up the edges of the known object, and an edge processor for processing the edges to provide a clean-edged extraction of the known object from a background image. Preferably, the key point locator includes an alignment detector for detecting alignment of an image of the known object type with a skeleton image. Still more preferably, the skeleton image is an exoskeleton image and the known object type is a human being.

A method for subtracting a background in accordance with the present invention includes locating key points on a known object type, locating boundary points of the known object that comprise edges of the known object, and processing the edges to provide a clean-edged extraction of the known object from a background image. Preferably, locating the key points include detecting the alignment of an image of the known object type with a skeleton image. Even more preferably, the key points include primary key points at extremities of an image of the human being and secondary key points near a torso of an image of the human being.

These and other advantages of the present invention will become apparent upon a study of the specification and drawings of this application.

DETAILED DESCRIPTION OF THE PREFERRED EMBODIMENTS

Figure 1A:
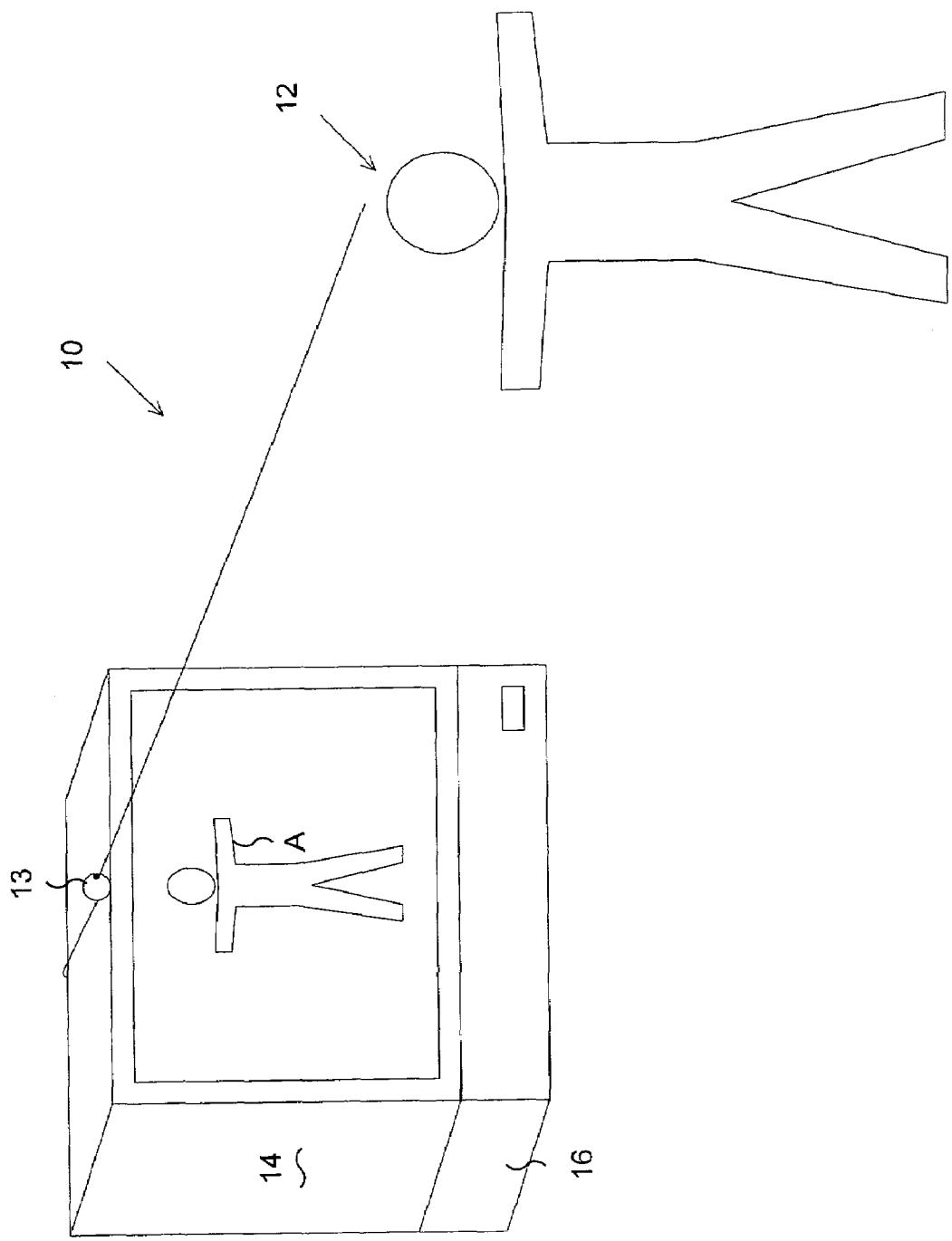
FIG. 1a is a perspective view of a person standing in front of an apparatus made and operated in accordance with the present invention.

FIG. 1a is an illustration of an apparatus 10 in accordance with the present invention. A user 12, e.g. a child, stands in front of a camera 13 in a pose in which the arms are extended outwardly and the legs are spread somewhat apart. That is, the child moves to fit herself within a skeleton "A" shown on a video monitor 14. The camera 13 and the video monitor 14 are typically connected to a computer 16, as will be appreciated by those skilled in the art. The computer 16 includes or has access to computer implemented process instructions stored within computer readable media (such as RAM, ROM, magnetic or optical media, over a network, etc.) to perform methods ("computer implement processes") of the present invention.

The skeleton A is an outline of an object or figure that is to be digitally removed from its background. When the object or figure is a human being, a preferred skeletal outline is somewhat of a hollow, five-pointed star shape. The "skeletons" described with reference to the current example are more in the nature of exoskeletons, since they surround the image of the figure to be extracted, although they can also be internal skeletons (e.g. a stick figure of a human being), or combinations thereof, in alternate embodiments of the present invention.

Figure 1B:
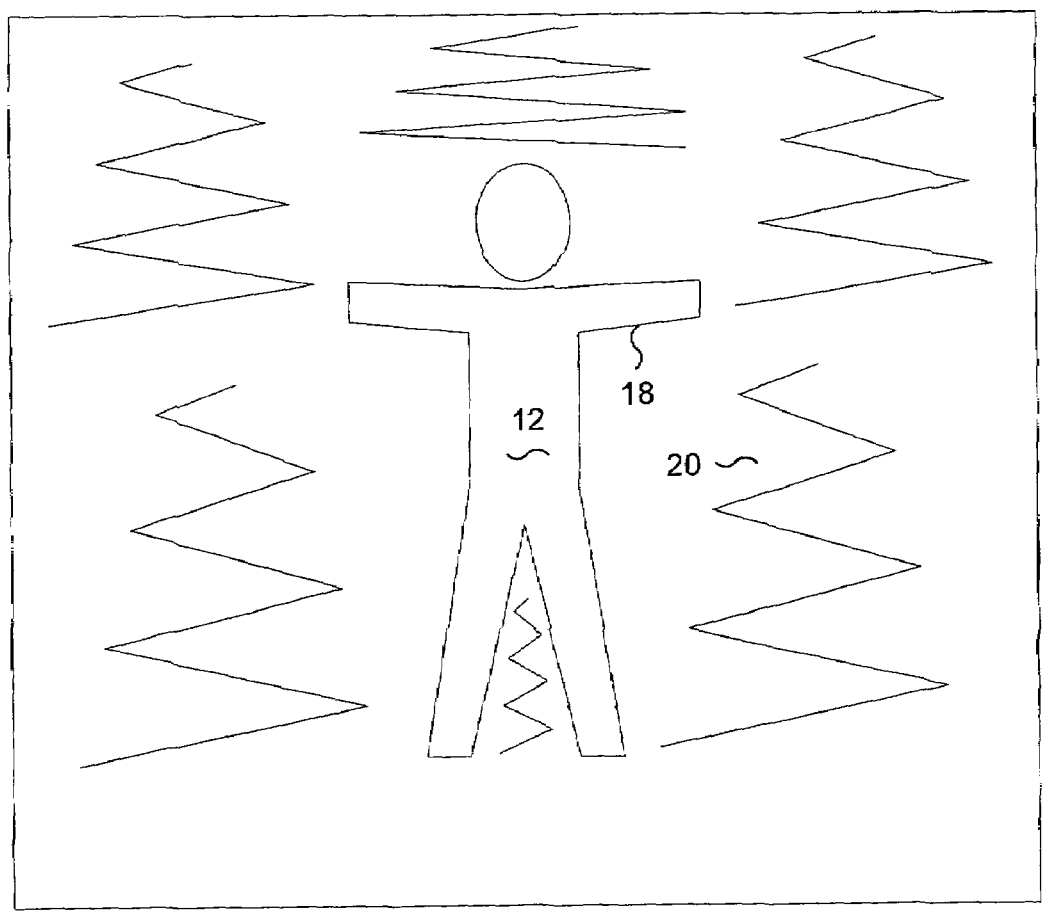
FIG. 1b is an illustration of a user's image with the background removed, where the user's image has clean edges due to the method and apparatus of the present invention.

FIG. 1b illustrates an output created by the method and apparatus of the present invention, that is, a clean image of a user with the background removed. This is shown as the image of the user 12 with a black background 20 and an outline 18 of the object with a clean edge. In a preferred embodiment, the background pixels become transparent pixels and are not the same color as any of the pixels on the object being texture mapped or composited.

Figure 2A:
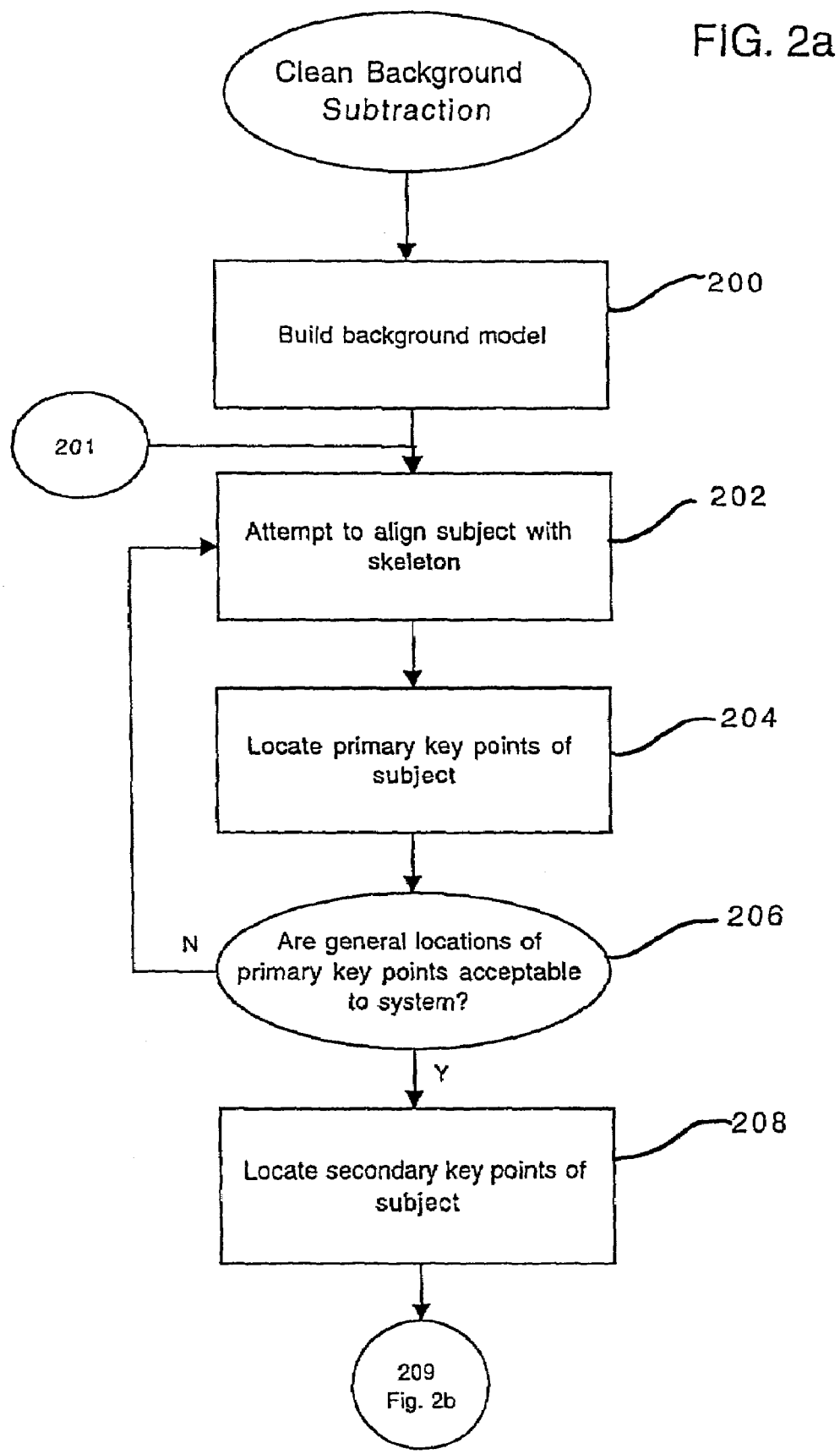
FIGS. 2a–2c comprise a flow diagram of a method for performing clean background subtraction in accordance with the present invention.
Figure 2B:
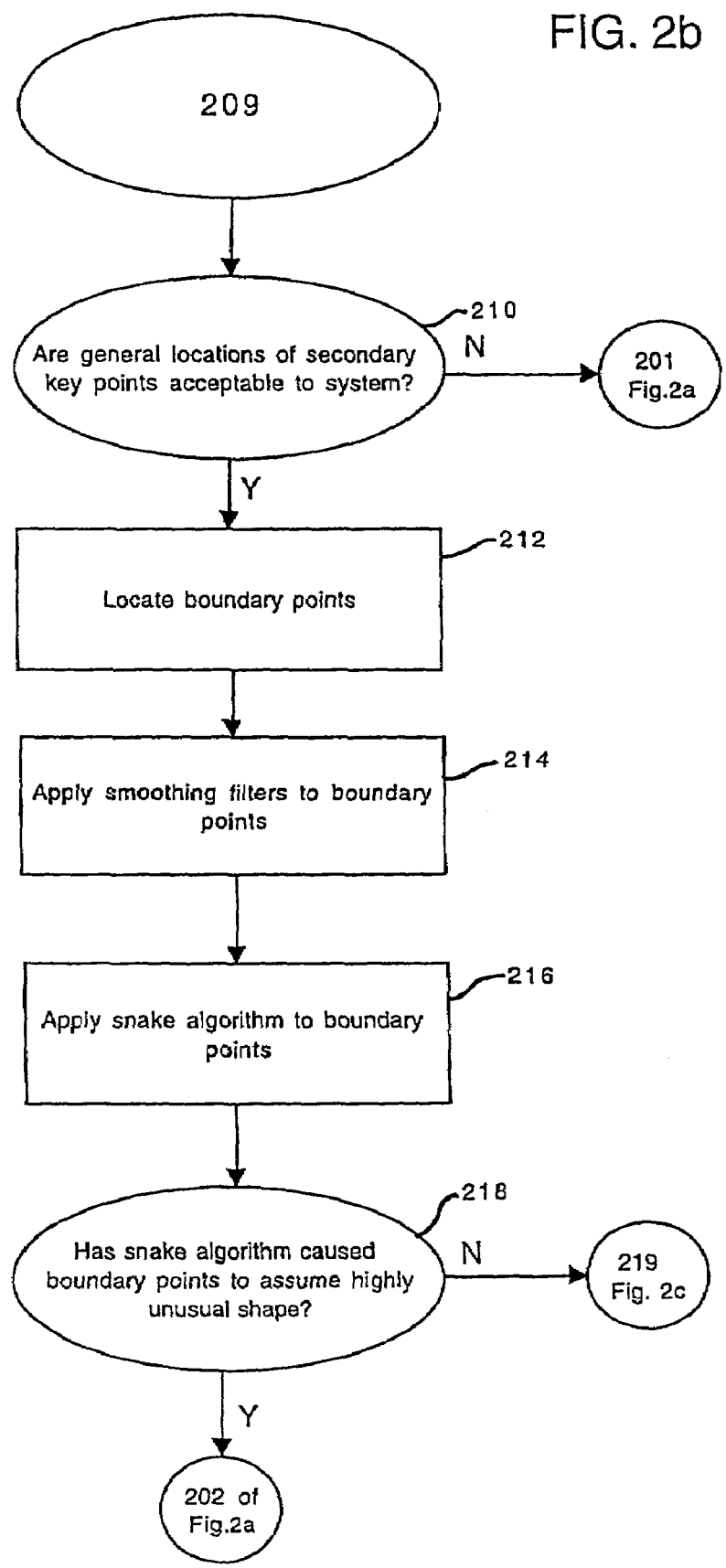
Figure 2C:
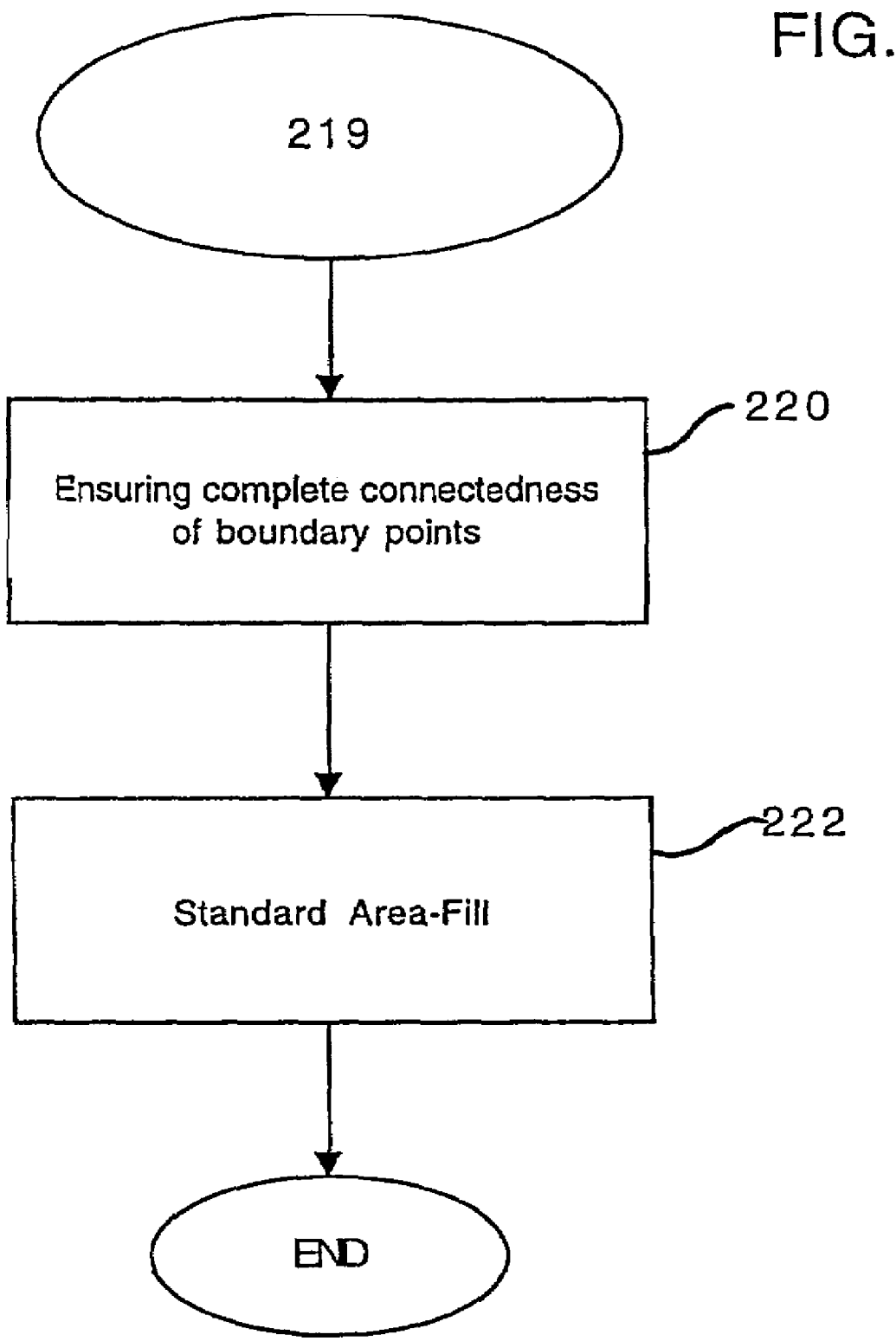

FIGS. 2a–2c are flowcharts which collectively illustrate a process (comprising, but not limited to, a computer implemented process) for performing the clean background subtraction procedure of the present invention. At 200 the system builds a background model which is a model of the background image that the camera sees without the subject in the image. Once the background model (for example an image of a bedroom or a living room) is created, the system then captures an image of the background model with the subject, such as a human being, that has moved into the background. Essentially this is an image of, for example, a child that has moved in front of the camera after the background model has been created. In a preferred embodiment, the subject is required to generally fit her pose to approximately match a frame or skeleton shown on the computer monitor. An example of a pose is shown in FIG. 1a. This is done in block 202.

At 204 the system locates primary key points of the subject. For a human figure these key points or extremities include the tips of the left and right hands, top of the head, and the bottom of the left and right feet. These are shown at points "P" in FIG. 3. At 206 the system determines whether the general locations of the primary key points are acceptable to the system. That is, are the extremities such as the ends of the hands and the feet and the head in an area where the system would normally expect to find them.

If the system does not find these extremities in the general locations, control returns back to block 202 where the system will take another input image of the subject aligning itself with the skeleton. This indicates that the subject is not yet properly aligned with the skeleton outline. If the locations of the primary key points are generally acceptable to the system, the process continues to block 208.

At 208 the system locates secondary key points of the subject. These are shown at points "S" in FIG. 3. The processing for determining these secondary key points depend on first properly locating the primary key points P of the subject. The secondary key points of a human figure are the left and right shoulders, the left and right arm pits, and the crotch. These points are located depending on where the system locates the primary key points as determined in step 204. Thus, for example, if in block 204 the system does not find the left and right key points properly, the system does not find the proper point for the crotch.

Similar to block 206, at 210 the system checks whether the secondary key points are located in areas where the system would generally expect to see them based on typical body proportions. If any one of them is not where the system expects to be, control returns to block 202. Once the locations of the ten key points, in the current example, (see FIG. 3) are determined, the system now has a definition of ten approximately linear segments that essentially connect these key points and define a general outline of the subject.

At 212 the system determines the locations of boundary points among the ten key points. These boundary points are located essentially by scanning the image in a certain direction, the direction depending on the orientation of the line segments between the key points. For example, a line segment between the left hand and the left arm pit would require a scan that begins at a certain offset away from the outline. The offset is determined by a bounding box whose corners are set by the key points of the segment, plus a pad of a fixed number of pixels, such as ten pixels in a preferred embodiment.

During the scan pixels in one vertical column are examined one by one. Many of the pixels scanned first would be background pixels until the scan reached the lower edge of the child's arm, at which point the scan would detect a foreground pixel. It would then mark this pixel as a boundary point. This procedure is done for all the columns in the approximately linear segment between the hand and the arm pit.

The collection of these boundary points can be seen as a silhouette line which is further refined to form part of a closed curve such that the curve will define the outline of the object. For example, a segment that goes from the left arm pit to the left foot would require a horizontal scan, scanning each pixel in a horizontal row until the scan reached a pixel indicating a foreground pixel. That pixel will be marked as a boundary point in the linear segment between the left arm pit and left foot.

Thus, once the process in block 212 is complete, the system has a series of boundary points that defines fairly closely the outline of the object but still includes nuances and aberrations, i.e. noise, that are on the edges of the object. The key points are used as start and stop delimiters in the scans. The boundary points are stored in a one-dimensional array. Thus, in a preferred embodiment, all the boundary points determined from the ten scans are stored in sequence in this one-dimensional array.

At 214 the system performs a series of smoothing filters to reign in aberrant boundary points, thereby reducing some of the noise in the object's edge. A basic assumption made by the system in applying these filters is that edges between key points are relatively smooth curves. One of the filters, in a preferred embodiment, is a Gaussian model applied to dampen noise in the edges, as represented by the boundary points. In a preferred embodiment, the Gaussian model uses a window or range of about five pixels. The effect of applying the Gaussian model is to bring boundary points that deviate significantly from surrounding boundary points closer to their surrounding boundary points. It has the effect of dampening or lessening the difference between an aberrant point and points in its vicinity.

The Gaussian model smoothing procedure has the effect of a low-pass filter applied to the boundary points. The window used in the Gaussian model is set so that an appropriate smoothing of the boundary points occurs. If the window of boundary points for the Gaussian model is too large, the overall effect is an averaging effect over the boundary points which is generally not desirable due to the lack of accuracy. If the window is too small there is essentially no smoothing effect on the boundary points.

The other smoothing filter is known in the art as a least-square filter which also uses an appropriately sized window of pixels. All the boundary points within the window are aligned or brought closer to a line that is fitted to the boundary points within the window. Thus, the least-square method is a way of fitting a line through the boundary points in a window. The system minimizes the sum of the squares of deviations from the line. The system then places boundary points so that they fit close to or on the line.

At 216 the system runs a snake algorithm to further eliminate noise from the edge of the object. The boundary points comprise a line that make up one input to the snake algorithm. In the application of the snake algorithm as used in the present invention, there are attractive forces acting on the line that bring the line closer to a noise-reduced edge of the object. At the same time the line, or "snake," itself has an internal energy that tends to keep the snake in its original shape to some degree. Thus, there is a tension between the attractive force of the edge of the object and the natural tendency of the line to keep its original shape. The snake has sufficient internal energy so that it can ignore significant deviations in the edge of the object. As with the smoothing filters, the key points do not move as a result of the snake algorithm acting as anchors. The snake itself, however, is elastic and can stretch or shrink to match the edge as needed.

The forces, both from external features, that attract the snake to the edge are (1) an edge strength, and (2) an alpha image. The snake has a tendency to align itself along a portion of the alpha image such that on one side the alpha pixels are zero and on the other side the alpha pixels are one.

A Canny edge detector is used to determine the edge strength. The Canny algorithm is a well-known method for detecting edges. The Canny filter is applied to the input image itself not the alpha image. Thus, in a preferred embodiment, the snake algorithm has generally three inputs. One is from the Canny filter performed on the input image, another is the alpha image, and the third is the contour line made up of boundary points between two key points.

The snake algorithm is well-known in the field of computer vision and operates as an energy minimization procedure. In a preferred embodiment, the snake algorithm takes into account three sources of energy, as described above, in making the snake represent a clean edge of the object. In the present implementation of the snake algorithm the boundary points comprising the snake can move in only one dimension, either left or right, or up and down. This has the effect of greatly increasing the speed of adjustment iterations made by the snake. The class of snake applied in the process is determined essentially by how much weight is given to the different sources of energy.

With reference to FIG. 2c, at 220 the system connects the boundary points such that there is a complete or closed loop of pixels constrained by the boundary points. This is necessary because the area fill that eventually fills in the area within the closed loop, will not perform well if there are gaps between the boundary points. Thus, even if the boundary points are sequentially ordered, they may not be adjacent. Therefore, extra pixels may have to be added so that there are no pixel gaps between them. Once the boundary loops are connected, thereby forming a closed loop, a standard area fill algorithm is used to generate an improved alpha image. This alpha image can subsequently be used to create a clean background subtracted image. A standard area-fill is accomplished at 222, and the process is complete.

Returning to blocks 204 and 208, the system locates the key points using a general search area and a key point template. Each of the key points have a general search area associated with it. The general search area is the area within which the system expects to find the key point. A template is used to search within the general search area to locate the best region, i.e., the region most likely to be precise key point, within the general search area.

In performing this process, the system uses the alpha image of the subject. Thus, pixels within or on the edge of the subject have a value of one, for example, and pixels outside the subject have a value of zero. Each key point has a specially configured template, although a template for the right hand key point is a mirror image of the template for the left hand key point, and similarly for the left and right feet, shoulders, and armpits.

The template resembles a miniature alpha image. A typical size of a template (significantly smaller than the general search area) is 20 pixels by 20 pixels, in a preferred embodiment. The pixels that have a value of one within the template make up a shape that resembles the expected shape of the key point being search for.

In a preferred embodiment, template patterns are restricted to be rectangles, so that a Summed Area Table (S.A.T.) facilitates an efficient search. The template is applied to each 20 by 20 region within the general search area. Each time it is applied, the system determines how many of the "one" alpha pixels in the template match the "one" alpha pixels in the subject image. The region in the subject alpha image that has the highest similarity score is determined to be the key point. This process is done for all the primary and secondary key points.

If none of the regions in a general search area gets a similarity score above a certain threshold after being checked by the template, the system assumes that the subject did not strike a pose that generally matched the skeleton and waits for another pose, thereby returning control to block 202. This is one way for the system to determine if primary key points and secondary key points are ascertainable given the subject's alignment with the skeleton.

Figure 3:
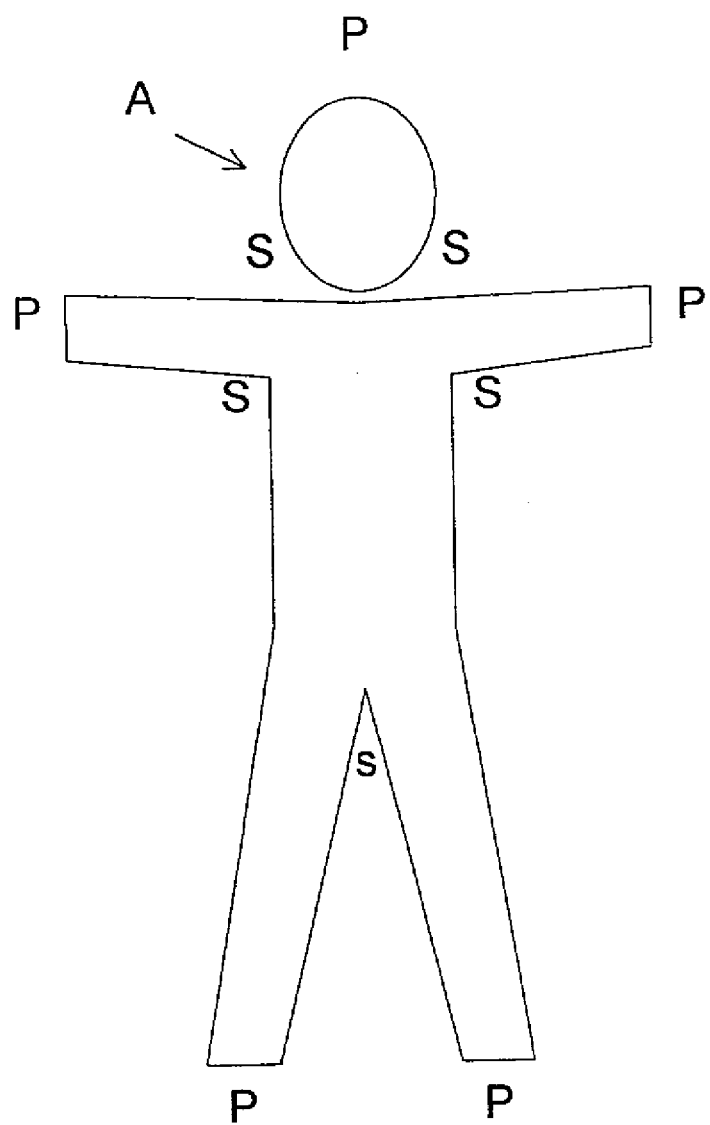
FIG. 3 illustrates ten key points on a "skeleton" used by the method and apparatus of the present invention.

FIG. 3 illustrates ten key points (labeled "S" and "P") associated with a skeleton A in accordance with the present invention. It should be noted that more or fewer key points can be used, as will be appreciated by those skilled in the art. The key points "P" are primary key points, and are located at the extremities of the skeleton A. The key points "S" are secondary key points, and are located proximate to the torso of the skeleton A at the points where the limbs and neck attach to the torso.

While this invention has been described in terms of several preferred embodiments, it will be apparent to those of skill in the art that various equivalents, permutations, and additions thereof are within the scope of the present invention. It is therefore intended that the following appending claims include all such equivalents, permutations and additions as fall within the true spirit and scope of the present invention.

What is claimed is:

1. A method for subtracting a background comprising:
   locating key points on an image of a known object type;
   determining line segments between the key points;
   locating boundary points of the image that comprise edges of the known object by using the line segments;
   eliminating pixel gaps between the boundary points;
   connecting the boundary points to obtain a closed loop of pixels; processing the edges to provide a clean-edged extraction of the image from a background image, including using an alpha image to determine a key point, which is selected based on a similarity score for a region in the alpha image; and
   reducing noise from the edges of the known object, after determining the key points, using an edge strength, the alpha image, and the line segments by aligning a snake to the line segments;
   wherein at least one key point is located based at least in part on a key point template comprising a plurality of pixels and specially configured for that key point; and
   wherein the pixels in the specially configured key point template that make up a shape associated with the key point have a first value and the other pixels in the specially configured key point template have a second value.

2. A method for subtracting a background as recited in claim 1 further including aligning the image with a skeleton image prior to locating the key points.

3. A method for subtracting a background as recited in claim 1 wherein locating boundary points includes scanning the image in directions dependent upon the orientation of the line segments.

4. A method for subtracting a background as recited in claim 1 wherein the key points include primary key points and secondary key points located based on the primary key points.

5. A method for subtracting a background as recited in claim 1 wherein locating the key points includes using a general search area.

6. A method for subtracting a background as recited in claim 1 wherein locating the key points includes using a general search area and a Summed Area Table.

7. A method for subtracting a background as recited in claim 1 wherein locating the key points includes:
   locating primary key points;
   determining whether the primary key points are in acceptable locations;
   repeating locating primary key points if the primary key points are determined not to be in acceptable locations;
   locating secondary key points based on the primary points;
   determining whether the secondary points are in acceptable locations;
   repeating locating secondary key points if the secondary key points are determined not to be in acceptable locations.

8. A method for subtracting a background as recited in claim 1 further including aligning the image of the known object type with a skeleton image prior to locating the key points, wherein the skeleton image is an outline image.

9. A method for subtracting a background as recited in claim 1 further including:
   aligning the image of the known object type with a skeleton image prior to locating the key points;
   scanning the image in directions dependent upon the orientation of the line segments, beginning at an offset away from the skeleton image.

10. A method for subtracting a background as recited in claim 1 further including:
    aligning the image with a skeleton image prior to locating the key points;
    scanning the image in directions dependent upon the orientation of the line segments, beginning at an offset away from the skeleton image;
    wherein the offset is determined by a bounding box whose corners are set by the key points.

11. A method for subtracting a background as recited in claim 1 further including:
    aligning the image with a skeleton image prior to locating the key points;
    scanning the image in directions dependent upon the orientation of the line segments, beginning at an offset away from the skeleton image;
    wherein the offset is determined by a bounding box whose corners are set by the key points plus a pad of pixels.

12. A method for subtracting a background as recited in claim 1 further including aligning the image with a skeleton image prior to locating the key points, wherein the skeleton image is an outline image and the known object type is a human being.

13. A method for subtracting a background as recited in claim 1 further including aligning the image with a skeleton image prior to locating the key points, wherein:
    the skeleton image is an outline image;
    the known object type is a human being; and
    the key points include primary key points at extremities of the image and secondary key points near a torso of the image.

14. A method for subtracting a background as recited in claim 1 wherein processing the edges includes filtering the edges.

15. A background subtraction apparatus comprising:
    an image acquisition device for acquiring an image of a known object type; and
    a processor configured to:
      locate key points on the image;
      determine line segments between the key points;
      locate boundary points of the image that comprise edges of the known object by using the line segments;
      eliminate pixel gaps between the boundary points;
      connect the boundary points to obtain a closed loop of pixels;
    process the edges to provide a clean-edged extraction of the image from a background image including using an alpha image to determine a key point, which is selected based on a similarity score for a region in the alpha image; and
      reduce noise from the edges of the known object, after determining the key points, using an edge strength, the alpha image, and the line segments by aligning a snake to the line segments;

wherein at least one key point is located based at least in part on a key point template comprising a plurality of pixels and specially configured for that key point; and wherein the pixels in the specially configured key point template that make up a shape associated with the key point have a first value and the other pixels in the specially configured key point template have a second value.

16. A background subtraction apparatus as recited in claim 15 wherein the processor is further configured to align the image with a skeleton image.

17. A background subtraction apparatus as recited in claim 15 wherein the processor is further configured to scan the image in directions dependent upon the orientation of the line segments.

18. A background subtraction apparatus as recited in claim 15 wherein the key points include primary key points and secondary key points located based on the primary key points.

19. A background subtraction apparatus as recited in claim 15 wherein the processor is further configured to locate the key points using a general search area.

20. A background subtraction apparatus as recited in claim 15 the processor is further configured to locate the key points using a general search area and a Summed Area Table.

21. A background subtraction apparatus as recited in claim 15 wherein the processor is further configured to:
   locate primary key points;
   repeat locating primary key points if the primary key points are determined not to be in acceptable locations;
   locate secondary key points based on the primary key points;
   determine whether the secondary key points are in acceptable locations;
   repeat locating secondary key points if the secondary key points are determined not to be in acceptable locations.

22. A background subtraction apparatus as recited in claim 15 wherein the processor is further configured to align the image of the known object type with a skeleton image, wherein the skeleton image is an outline image.

23. A background subtraction apparatus as recited in claim 15 wherein the processor is further configured to:
   align the image of the known object type with a skeleton image prior to locating the key points;
   scan the image in directions dependent upon the orientation of the line segments, beginning at an offset away from the skeleton image.

24. A background subtraction apparatus as recited in claim 15 wherein the processor is further configured to:
   align the image with a skeleton image prior to locating the key points;
   scan the image in directions dependent upon the orientation of the line segments, beginning at an offset away from the skeleton image;
   wherein the offset is determined by a bounding box whose corners are set by the key points.

25. A background subtraction apparatus as recited in claim 15 wherein the processor is further configured to:
   align the image with a skeleton image prior to locating the key points;
   scan the image in directions dependent upon the orientation of the line segments, beginning at an offset away from the skeleton image;
   wherein the offset is determined by a bounding box whose corners are set by the key points plus a pad of pixels.

26. A background subtraction apparatus as recited in claim 15 wherein the processor is further configured to align the image with a skeleton image, wherein the skeleton image is an outline image and the known object type is a human being.

27. A background subtraction apparatus as recited in claim 15 wherein the processor is further configured to align the image with a skeleton image, wherein:
   the skeleton image is an outline image;
   the known object type is a human being; and
   the key points include primary key points at extremities of the image and secondary key points near a torso of the image.

28. A background subtraction apparatus as recited in claim 15 wherein the processor is further configured to filter the edges.

* * * * *